(12) United States Patent
Ikeda et al.

(10) Patent No.: US 9,263,722 B2
(45) Date of Patent: Feb. 16, 2016

(54) CONNECTION STRUCTURE FOR A WIRING MEMBER

(75) Inventors: Tomohiro Ikeda, Makinohara (JP); Katsunori Sato, Makinohara (JP); Hiroyuki Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 70 days.

(21) Appl. No.: 13/634,785

(22) PCT Filed: Apr. 12, 2011

(86) PCT No.: PCT/JP2011/059102
§ 371 (c)(1),
(2), (4) Date: Sep. 13, 2012

(87) PCT Pub. No.: WO2011/132571
PCT Pub. Date: Oct. 27, 2011

(65) Prior Publication Data
US 2013/0000957 A1    Jan. 3, 2013

(30) Foreign Application Priority Data
Apr. 22, 2010    (JP) .................................. 2010-099196

(51) Int. Cl.
*H05K 1/00*  (2006.01)
*H01M 2/20*  (2006.01)
*H01R 11/28*  (2006.01)

(52) U.S. Cl.
CPC .............. *H01M 2/204* (2013.01); *H01R 11/288* (2013.01)

(58) Field of Classification Search
USPC ........... 174/267, 254; 361/749–751, 771–776
See application file for complete search history.

(56) References Cited

U.S. PATENT DOCUMENTS

| 6,261,719 | B1 | 7/2001 | Ikeda et al. |
| 7,147,485 | B2 * | 12/2006 | Ohta et al. ................... 439/76.1 |
| 8,624,122 | B2 * | 1/2014 | Shiraiwa et al. .............. 174/252 |
| 2004/0087192 | A1 | 5/2004 | Ohta et al. |
| 2006/0194101 | A1 | 8/2006 | Ha et al. |

(Continued)

FOREIGN PATENT DOCUMENTS

| CN | 101069328 A | 11/2007 |
| EP | 1 054 461 A2 | 11/2000 |
| JP | 10308205 A | 11/1998 |

(Continued)

OTHER PUBLICATIONS

International Search Report (PTO/ISA/210) dated Jul. 5, 2011 issued by the Japanese Patent Office in corresponding International Application No. PCT/JP2011/059102.

(Continued)

*Primary Examiner* — Jeremy C Norris
(74) *Attorney, Agent, or Firm* — Sughrue Mion, PLLC (57) ABSTRACT

There is provided a structure for connecting a wiring member to a bus bar in which smooth connection is enabled while ensuring high reliability. In an end portion of a bus bar, a soldering portion which is smaller in cross-sectional area than the bus bar is formed. A connection projecting piece which is raised up in a pin-like manner is formed on the soldering portion. The connection projecting piece is passed through a connection hole which is formed in a connection end of a branch wiring portion of a wiring member configured by a flexible printed circuit board. The connection projecting piece which is passed through the connection hole is soldered to a circuit pattern.

5 Claims, 5 Drawing Sheets

(56) References Cited

U.S. PATENT DOCUMENTS

2006/0225914 A1* 10/2006 Tan .............................. 174/254
2010/0307800 A1* 12/2010 Wee et al. ..................... 174/257

FOREIGN PATENT DOCUMENTS

| JP | 2000149909 A | 5/2000 |
| JP | 2001-110396 A | 4/2001 |
| JP | 2006073362 A | 3/2006 |
| JP | 2008288077 A | 11/2008 |
| JP | 2008304295 A | 12/2008 |
| JP | 2009-289429 A | 12/2009 |
| JP | 20103466 A | 1/2010 |
| JP | 2010157399 A | 7/2010 |

OTHER PUBLICATIONS

Written Opinion (PTO/ISA/237) of the Japanese Patent Office dated Jul. 5, 2011 in corresponding International Application No. PCT/JP2011/059102.

Office Action dated Aug. 18, 2014 issued by the State Intellectual Property Office of the People's Republic of China in counterpart Chinese Patent Application No. 201180020306.8.

Office Action dated Dec. 2, 2014, issued by the Japanese Intellectual Property Office in counterpart Japanese Application No. 2010-099196.

Second Office Action dated Mar. 19, 2015, issued in corresponding Chinese Application No. 201180020306.8 with English translation.

* cited by examiner

CONNECTION STRUCTURE FOR A WIRING MEMBER

TECHNICAL FIELD

The present invention relates to a structure for connecting a wiring member to a bus bar which is to be connected to a battery mounted on an electric vehicle or a hybrid vehicle.

BACKGROUND ART

As eco-friendly vehicles, electric vehicles and hybrid vehicles are being increasingly used. On such a vehicle, a power supply apparatus configured by battery assemblies in each of which a plurality of batteries are stacked on one another is mounted.

In order to connect in series the battery assemblies configured by stacking in alternately opposite directions, the batteries of the power supply apparatus are connected to one another by bus bars each having two holes through which electrodes (terminals) of adjacent batteries are passed through, respectively, and, in order to detect the voltage of each battery, a signal line which is connected to each bus bar to output the voltage of the battery to the outside is wired to the bust bar (for example, see Patent Document 1).

PRIOR ART DOCUMENT

Patent Documents

Patent Document 1: Japanese Patent Application Publication No. 2000-149909A

SUMMARY OF INVENTION

Problems to be Solved by Invention

In consideration of a weight reduction of a power supply apparatus, it is contemplated that, in a wiring for detecting the voltage of a battery, a flexible printed circuit board (FPC) is used as a wiring member, and a wiring board configured by the flexible printed circuit board is soldered to a bus bar.

Since a bus bar is formed by copper, copper alloy, or the like having a high thermal conductivity, however, heat is dissipated to the bus bar during the soldering operation, and the working time period of bonding by soldering is prolonged. Moreover, bonding by solder is caused to be unstable by heat dissipation, and there is a possibility that the reliability of a connecting place is hardly ensured.

When a flexible printed circuit board is overlaid on a bus bar and a circuit pattern and the bus bar are soldered to each other, the bonding place is hidden, and it is difficult to manage the connecting place.

The invention has been conducted in view of the above-discussed circumstances. It is an object of the invention to provide a structure for connecting a wiring member to a bus bar in which smooth connection is enabled while ensuring high reliability.

Means for Solving Problems

The object of the invention is attained by the following configuration:

(1) A connection structure for a wiring member wherein a soldering portion is formed in an end portion of a bus bar, the soldering portion being smaller in cross-sectional area than the bus bar, wherein a projecting piece which is raised up in a pin-like manner is formed in the soldering portion, wherein the projecting piece is passed through a hole portion of the wiring member configured by a flexible printed circuit board, and wherein the projecting piece which is passed through the hole portion, and a circuit pattern of the wiring member are soldered to each other.

According to the connection structure for a wiring member, the pin-like projecting piece which is raised from the soldering portion that is smaller in cross-sectional area than the bus bar, and which is passed through the hole portion of the wiring member has the small cross-sectional area with respect to the bus bar. When the projecting piece which is passed through the hole portion, and the circuit pattern of the wiring member are to be soldered to each other, therefore, dissipation of the heat of the operation to the bus bar can be suppressed as far as possible. Consequently, the work of soldering the projecting piece to the circuit pattern can be performed very satisfactorily and within a short time period, so that the bonding by solder can be stabilized, and high reliability of the connecting place can be obtained.

Moreover, it is possible to visually check the bonded condition such as the deposited state of the solder in the soldering place between the projecting piece which is passed through the hole portion of the wiring member, and the circuit pattern. Therefore, the quality control of the connecting place can be easily performed.

(2) In the connection structure for the wiring member having the configuration of (1) above, the soldering portion is formed with an opening.

According to the connection structure for a wiring member, the opening is formed in the soldering portion, and therefore the cross-sectional area between the bus bar and the projecting piece can be reduced, so that dissipation of the heat to the bus bar during the soldering operation can be further suppressed.

(3) In the connection structure for the wiring member having the configuration of (1) or (2) above the bus bar is configured by stacking two plate portions on each other, and the soldering portion is formed in one of the plate portions.

According to the connection structure for a wiring member, the bus bar is configured by stacking the two plate portions on each other. Even when the bus bar is configured by thin plate portions having a small cross-sectional area, therefore, it is possible to ensure a cross-sectional area that is sufficient as a bus bar through which a current is to flow. Since the soldering portion is formed in one of the plate portions, the thickness of the soldering portion can be reduced to a half of the bus bar, so that the cross-sectional area can be reduced, and dissipation of the heat to the bus bar during the soldering operation can be suppressed. Since the soldering portion has a thickness which is half that of the bus bar, moreover, the projecting piece can be easily processed.

(4) In the connection structure for the wiring member having the configuration of any one of (1) to (3) above, the bus bar is formed from a bus bar coupled member which is formed in a chain-like manner by punching a metal plate, and the soldering portion is formed in a clearance, space in the bus bar coupled member.

According to the connection structure for a wiring member, the soldering portion is formed in a clearance space in the bus bar coupled member which is formed in a chain-like manner by punching a metal plate. Therefore, the material yield can be improved, so that the production cost can be reduced.

MODE TO CARRY OUT INVENTION

Hereinafter, an example of a preferred embodiment of the invention will be described with reference to the drawings.

Figure 1:
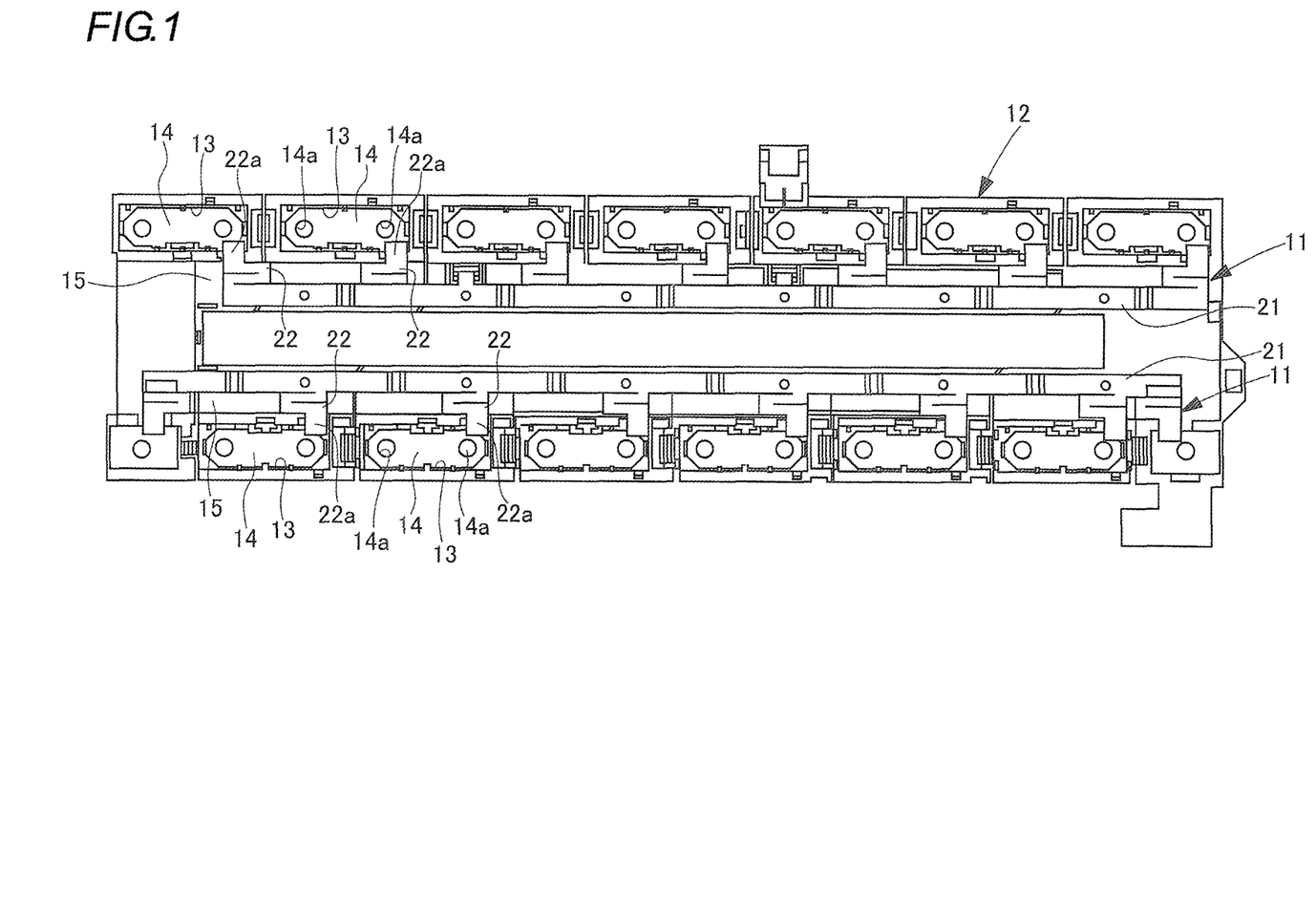
FIG. 1 is a plan view of a battery connection plate including a bus bar to which a wiring member in an embodiment of the invention is connected.

As shown in FIG. 1, a wiring, member 11 in an embodiment of the invention is attached to a battery connection plate 12. The battery connection plate 12 is molded from a synthetic resin. A plurality of bus bar attaching portions 13 are formed on the right and left sides. Bus bars 14 formed by a metal plate are fitted into the bus bar attaching portions 13. A pair of connection holes 14a are formed in each of the bus bars 14, and terminals of a plurality of batteries which are stacked on one another, and which are not shown are inserted into the connection holes 14a. Then, nuts are fastened to the terminals of the batteries, whereby the terminals are connected to the bus bars 14 in an electrically conductive state.

In the battery connection plate 12, wiring member attaching portions 15 are disposed along the bus bar attaching portions 13, and wiring members 11 are attached to the wiring member attaching portions 15.

Each of the wiring members 11 is configured by a flexible printed circuit board (FPC), and incorporated in the battery connection plate 12 as a wiring for detecting the voltage of a battery.

The wiring member 11 has: a linear portion 21 which is disposed along the terminal arrangement of the batteries; and a plurality of branch wiring portions 22 which laterally extend. In the branch wiring portions 22 of the wiring member 11, connection ends 22a formed by the tip ends of the portions are connected to the bus bars 14, respectively, whereby the portions are electrically connected to the terminals of the batteries through the bus bars 14.

Figure 2:
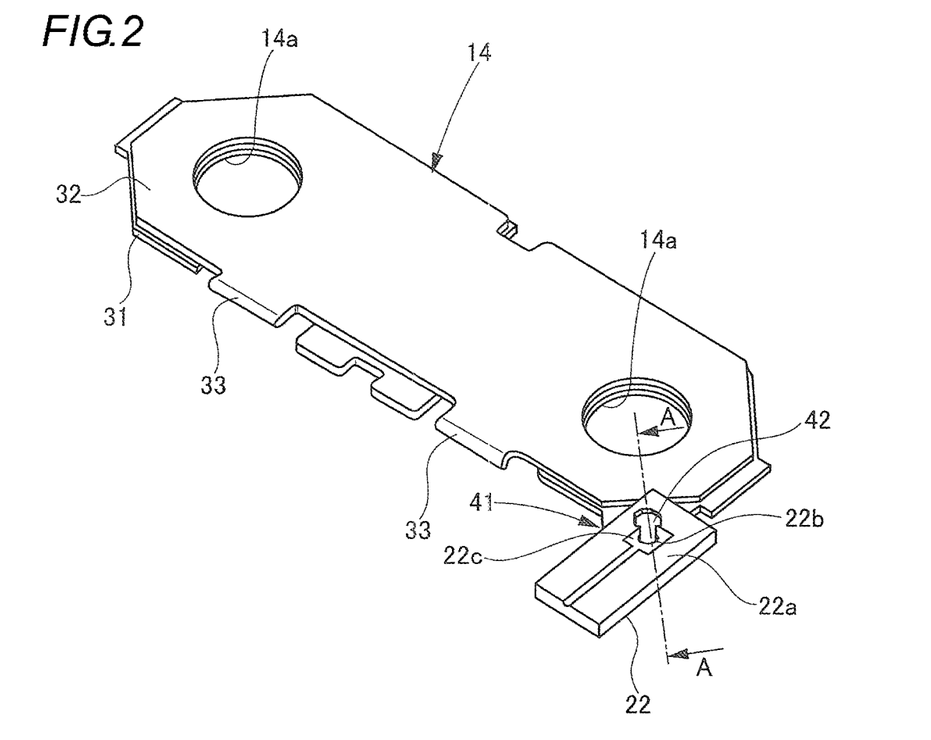
FIG. 2 is a perspective view of the bus bar to which the wiring member shown in FIG. 1 is connected.

As shown in FIG. 2, each of the bus bars 14 in the embodiment is formed by a metal plate of for example, copper, a copper alloy, or the like, and has a lower plate portion 31, and an upper plate portion 32 which is stacked on the lower plate portion 31. The lower plate portion 31 and the upper plate portion 32 are coupled to each other by a hinge portion 33 which is in one side.

In the bus bar 14 configured by the lower plate portion 31 and the upper plate portion moreover, a soldering portion 41 is formed in a corner of one end portion of the bus bar.

Figure 3:
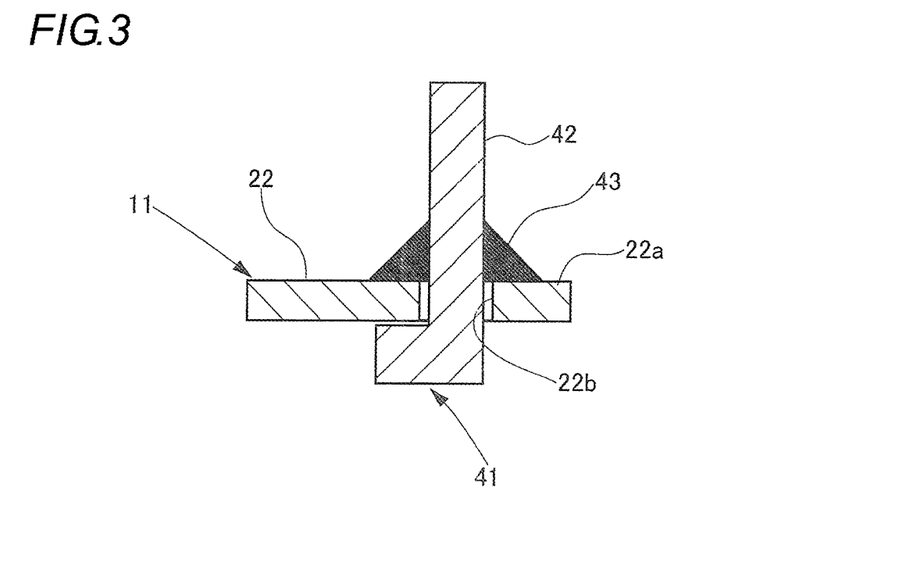
FIG. 3 is a sectional view taken along A-A in FIG. 2.
Figure 4:
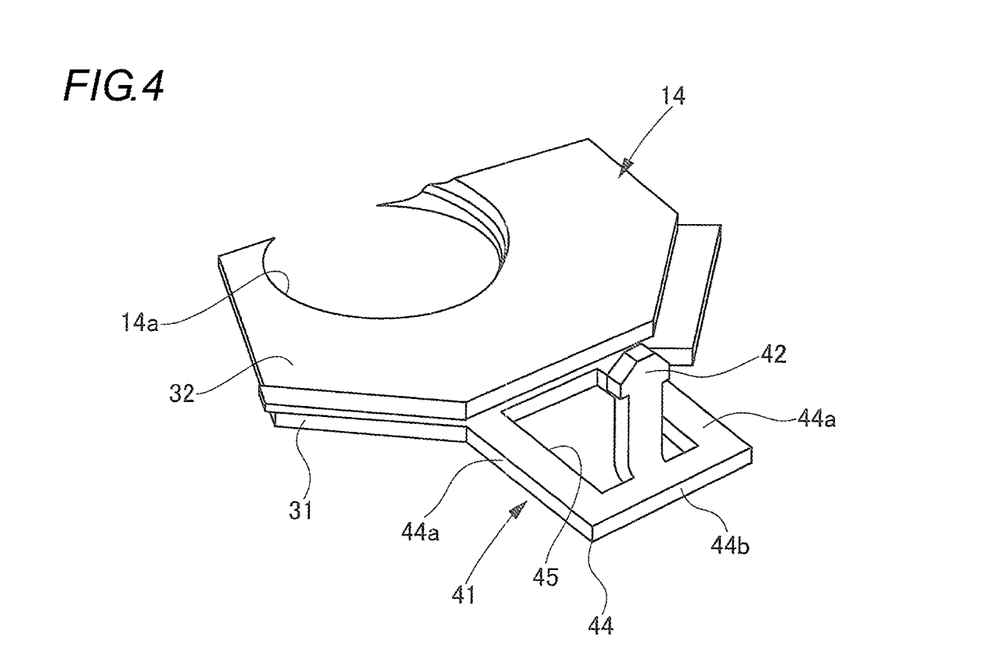
FIG. 4 is a perspective view of a soldering portion formed in the bus bar.

The soldering, portion 41 is formed in an end portion of the lower plate portion 31, and, as shown in FIGS. 3 and 4, has a pin-like connection projecting piece (projecting piece) 42.

The connection projecting piece 42 is inserted from the lower surface side into and passed through a connection hole (hole portion) 22b which is formed in the connection end 22a of each of the branch wiring portions 22 of the wiring member 11.

In the soldering portion 41, the connection projecting piece 42 which is inserted into the connection hole 22b, and a circuit pattern 22c of the branch wiring portion 22 of the wiring member 11 are bonded to each other by solder 43 on the side of the upper surface of the wiring member 11.

As shown in FIG. 4, the connection projecting piece 42 is extended from a part of a rectangular frame portion 11 which is formed in the lower plate portion 31, and upward raised. The frame portion 44 has: two longitudinal frame pieces 44a, in each of which one end is coupled to the lower plate portion 31; and one lateral frame piece 11b which is connected to the other end sides of the longitudinal frame pieces 44a. The connection projecting piece 42 is coupled to a side part of a middle portion of the lateral frame piece 44b. According to the configuration, an opening 45 which is surrounded by the longitudinal frame pieces 44a, the lateral frame piece 44b, and the lower plate portion 31 is formed in the soldering portion 41.

Figure 5:
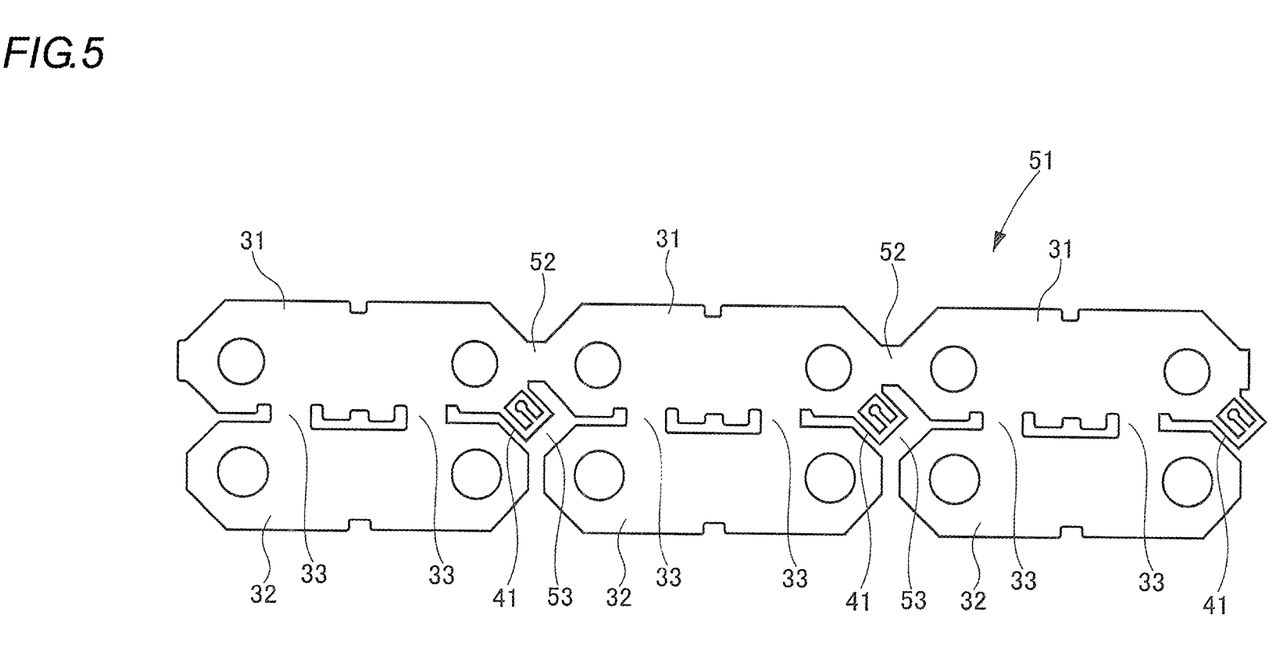
FIG. 5 is a plan view of a bus bar coupled member which is to be produced into the bus bar.

As shown in FIG. 5, the bus bar 14 having the above-described structure is configured from a chain-like bus bar coupled member (coupled member) 51. The chain-like bus bar coupled member 51 is formed by punching a metal plate. The bus bar coupled member 51 has a shape in which ends of the plurality of lower plate portions 31 are coupled to one another by coupling portions 52, and the upper plate portions 32 are coupled to the lower plate portions 31 by the hinge portions 33, respectively.

In the chain-like bus bar coupled member 51, moreover, the soldering portions 41 are formed in clearance spaces 53 between the lower plate portions 31 and the upper plate portions. 32 in areas between adjacent lower plate portions 31.

When the bus bar 14 is to be produced from the thus configured bus bar coupled member 5, the member is first bent at the hinge portions 33 to overlay the upper plate portions 32 on the lower plate portions 31. Next, the connection projecting pieces 42 of the soldering portions 41 are raised by bending the pieces in the vicinities of the portions coupled to the lateral frame piece 44b. Then, the lower plate portions 31 which are coupled to and adjacent to one another are cut off at the coupling portions 52, thereby separating the bus bars from one another.

When the connection end 22a of each of the branch wiring portions 22 of the wiring member 11 is to be connected to the soldering portion 41 of the bus bar 14 which is formed as described above, the connection projecting piece 42 of the soldering portion 41 is inserted into the connection hole 22b which is formed in the connection end 22a. The insertion of the connection projecting piece 42 into the connection hole 22b of the connection end 22a causes the connection end 22a of the branch wiring portion 22 to be held to the state where the connection end 22a is positioned about the soldering portion 41.

In this state, the basal portion of the connection projecting piece 42 which is passed through the connection hole 22b, and the circuit pattern 22c (see FIG. 2) of the branch wiring portion 22 are soldered together from the upper side of the branch wiring portion 22.

Here, the bus bar 14 has a thickness which is equal to the total of the thicknesses of the overlaid lower and upper plate portions 31 and 32. Since the soldering portion 41 is the part extended from the lower plate portion 31, the soldering portion has the same thickness as the lower plate portion 31, i.e., a thickness which is half that of the bus bar 14. Namely, the soldering portion 41 has a cross-sectional area which is very smaller than that of the bus bar 14. Furthermore, the opening 45 surrounded by the longitudinal frame pieces 44a, the lateral frame piece 44b, and the lower plate portion 31 is formed in the soldering portion 41.

When the connection projecting piece 42 which is passed through the connection hole 22b, and the circuit pattern 22c are to be soldered to each other, therefore, dissipation of the heat of the operation to the bus bar 14 can be suppressed as far as possible.

The operation of soldering the projecting piece 42 which is passed through the connection hole 22b, and the circuit pattern 22c is performed from the upper side of the branch wiring portion 22. Therefore, it is possible to visually check the bonded condition such as the deposited state of the solder 43 in the soldering place.

As described above, in the structure for connecting the wiring member 11 of the embodiment, the pin-like projecting piece 42 which is raised from the soldering portion 41 that is made smaller in cross-sectional area than the bus bar 14, and which is passed through the connection hole 22b of the wiring member 11 has the small cross-sectional area with respect to the bus bar 14. When the connection projecting piece 42 which is passed through the connection hole 22b, and the circuit pattern 22c of the wiring member 11 are to be soldered to each other, therefore, dissipation of the heat of the operation to the bus bar 14 can be suppressed as far as possible. Consequently, the work of soldering the connection projecting piece 42 to the circuit pattern 22c can be performed very satisfactorily and within a short time period, so that the bonding by the solder 43 can be stabilized, and high reliability of the connecting place can be obtained.

Moreover, it is possible to visually check the bonded condition such as the deposited state of the solder 43 in the soldering place between the connection projecting piece 42 which is passed through the connection hole 22b of the wiring member 11, and the circuit pattern 22c. Therefore, the quality control of the connecting place can be easily performed.

Since the opening 45 is formed in the soldering portion 41, moreover, the cross-sectional area between the bus bar 14 and the connection projecting piece 42 can be reduced, so that dissipation of the heat to the bus bar 14 during the soldering operation can be further suppressed.

Furthermore, the bus bar 14 is configured by stacking the two plate portions, i.e., the lower plate portion 31 and the upper plate portion 32 on each other. Even when the bus bar is configured by a thin metal plate having a small cross-sectional area, therefore, it is possible to ensure a cross-sectional area that is sufficient as the bus bar 14 through which a current is to flow. Since the soldering portion 41 is formed in the lower plate portion 31, the thickness of the soldering portion 41 can be reduced to a half of the bus bar 14 so that the cross-sectional area can be reduced, and dissipation of the heat to the bus bar 14 dining the soldering operation can be suppressed. Since the soldering portion 41 has a thickness which is half that of the bus bar 14, moreover, the connection projecting piece 42 can be easily processed.

Furthermore, the soldering portion 41 of the bus bar 14 is formed in the clearance space, 53 in the bus bar coupled member 51 which is formed by punching a metal plate. Therefore, the material yield can be improved, so that the production cost can be reduced.

For example, the bonding between the connection projecting piece 42 and the circuit pattern 22c may be performed by ultrasonic bonding.

Figure 6:
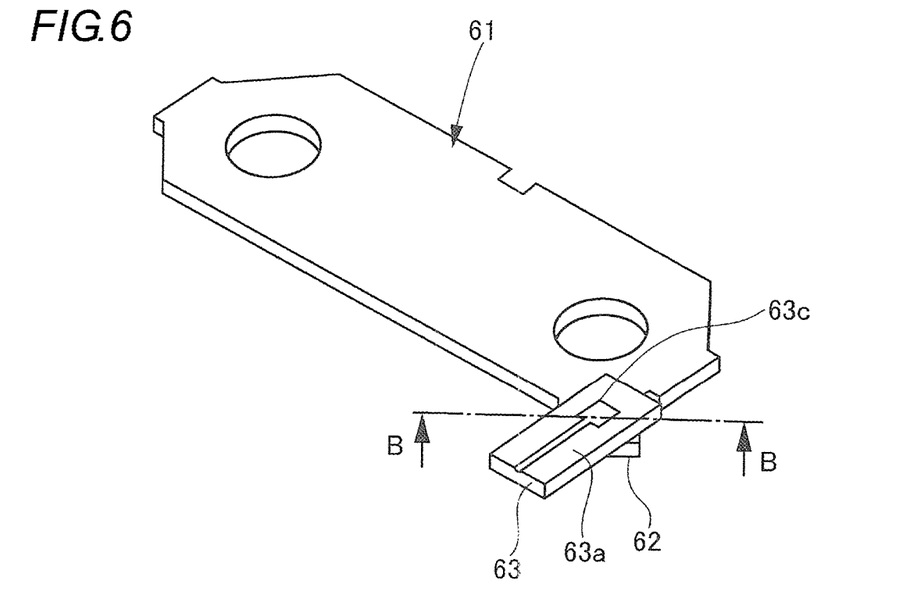
FIG. 6 is a perspective view showing a connection structure for a wiring member in a reference example.
Figure 7:
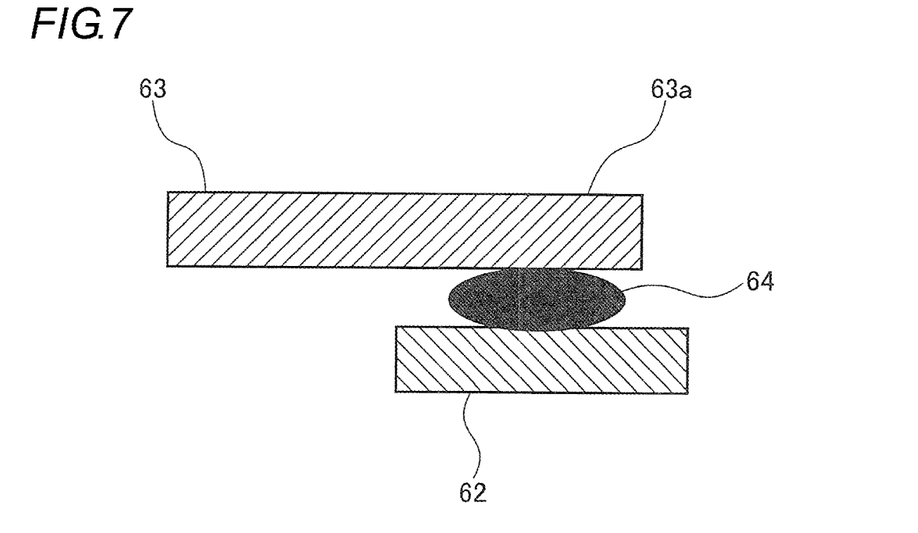
FIG. 7 is a sectional view taken along B-B in FIG. 6.

In order to describe a further superiority of the invention. FIGS. 6 and 7 show a reference example.

FIG. 6 is a plan view of a wiring member in the reference example, and FIG. 7 is a sectional view taken along B-B in FIG. 6.

In a bus bar 61, as shown in FIGS. 6 and 7, a soldering portion 62 which is extended from a part of the bus bar 61 is formed in an end portion of the bus bar. A connection end 63a of a branch wiring portion 63 of a wiring member configured by a flexible printed circuit board is overlaid on the soldering portion 62, and a circuit pattern which is exposed from the lower surface side of the connection end 63a, the soldering portion 62 are bonded together by solder 64.

In the connection structure, the heat during the soldering operation is dissipated to the bus bar 61 through the soldering portion 62 having the same thickness as the bus bar 61 and a large cross-sectional area. Therefore, the working time period of bonding, by soldering is prolonged. Moreover, bonding by solder becomes unstable, and the reliability of a connecting place is hardly ensured.

In the above-described connection structure, the place of bonding by soldering is hidden by the branch wiring portion 63 of the wiring member, and cannot be seen. Therefore, it is difficult to manage the connecting place.

The invention is not limited to the above-described embodiment, and may be adequately subjected to modifications, improvements, and the like. Namely, the invention may be executed while being variously modified without departing the essence of the invention. In addition, the materials, shapes, dimensions, numbers, places, and the like of the components of the above-described embodiment are arbitrary and not limited insofar as the invention is achieved.

The application is based on Japanese Patent Application (No. 2010-099196) filed Apr. 22, 2010, and its disclosure is incorporated herein by reference.

INDUSTRIAL APPLICABILITY

According to the connection structure for a wiring, member of the invention, the work of soldering the projecting piece to the circuit pattern can be performed very satisfactorily and within a short time period, so that the bonding by solder can be stabilized. Therefore, a wiring member can be smoothly connected, while ensuring high connection reliability, to a bus bar which is to be connected a battery mounted on a vehicle such as an electric vehicle or a hybrid vehicle.

DESCRIPTION OF REFERENCE NUMERALS 11 wiring member
14 bus bar
22b connection hole (hole portion)
22c circuit pattern
31 lower plate portion (plate portion)
32 upper plate portion (plate portion)
41 soldering portion
42 connection projecting piece (projecting piece)
45 opening
51 bus bar coupled member (coupled member)
53 clearance space

The invention claimed is:

1. A connection structure for a wiring member,
wherein a soldering portion is formed in an end portion of a bus bar, the soldering portion being smaller in cross-sectional area than the bus bar,
wherein the soldering portion includes an opening formed by a frame portion formed of the bus bar,
wherein a projecting piece which is raised up in a pin-like manner is formed at a portion of the frame portion in the soldering portion,
wherein the projecting piece is passed through a hole portion of the wiring member, the wiring member being configured by a flexible printed circuit board, and
wherein the projecting piece which is passed through the hole portion and a circuit pattern of the wiring member are soldered to each other.

2. The connection structure for the wiring member according to claim 1,
wherein the soldering portion is formed with an opening.

3. The connection structure for the wiring member according to claim 1, wherein the bus bar is configured by stacking two plate portions on each other, and the soldering portion is formed in one of the plate portions.

4. The connection structure for the wiring member according to claim 1, wherein the bus bar is configured by stacking two plate portions on each other, the soldering portion is formed in one of the plate portions, and the bus bar is formed from a bus bar coupled member which is formed in a chain-like manner by punching a metal plate, and
wherein the soldering portion is formed in a clearance space in the bus bar coupled member.

5. The connection structure for the wiring member according to claim 1, wherein the bus bar is linked to at least one additional bus bar in a chain-like manner.

* * * * *